UNITED STATES PATENT OFFICE.

SAMUEL L. BOGGS, OF IVANHOE, VIRGINIA.

PROCESS FOR ELIMINATING VOLATILE MATTER AND GASES FROM ORES, MINERALS, AND CLAYS.

1,363,387.     Specification of Letters Patent.     Patented Dec. 28, 1920.

No Drawing.     Application filed August 2, 1920. Serial No. 400,710.

*To all whom it may concern:*

Be it known that I, SAMUEL L. BOGGS, a resident of Ivanhoe, in the county of Carroll and State of Virginia, have invented a new and useful Improvement in Processes for Eliminating Volatile Matter and Gases from Ores, Minerals, and Clays, of which the following is a specification.

This invention relates to processes for eliminating volatile matter and gases from ores, minerals and clays.

The particular object of the invention is to so treat certain natural products such as ore, mineral, or clay, or combinations thereof, as to remove the volatile and gaseous matter therefrom, and to completely shrink the solid matter, so that in any subsequent treatment, the solid product will not change its volume either way.

One of the principal objects of the invention is to provide a treatment for refractory materials which will remove volatile matter and gases therefrom, and completely shrink the material, so that it may then be built into furnaces, or other apparatus adapted to be subjected to heat, without disintegration due to expansion and contraction.

For example, dolomite, which is a compound composed chiefly of the carbonates of magnesia and of lime is a highly refractory material. But, when furnace linings, bottoms, etc., are made of dolomite, there is the objection that when subjected to heat they expand, which causes the bricks or furnace walls to disintegrate.

Also, when certain clays are to be used for making pottery, china, etc., it is necessary to take out the volatile matter, gases and shrinkage, before the clays can be molded into final shape, as otherwise the articles made therefrom will be injured in the burning because of expansion.

The present process consists in a combination of various steps, which will now be described.

The raw material, which may be either an ore, a clay, or a mineral compound such as dolomite or magnesites, is first roasted in a furnace at a temperature of 1500 to 2000° Fahr. The period of this roasting will vary with the character of the material. It has been found that six hours is sufficient in most cases. This heating drives off a considerable amount of the volatile matter, and gases, but it is impossible in any commercial practicable temperature and time to sufficiently eliminate certain of the volatile products, such for example as carbonic acid gas ($CO_2$). It is the removal of this remaining portion of gases, etc., that is the function of the later steps of the present process.

The roasted material is crushed and pulverized by suitable machines, which are standardized and need not be described here.

The pulverized material is then run through a standardized flotation or hydrating machine. In the liquid used in this flotation machine a small amount of chemical reagent is added. I have found that alum, or ammonia, or better still a combination of the two, is a highly efficient reagent or flux. The use of such reagents is necessary where there is an excess of lime. Where lime is present in only small percentage, the use of alum, or even ammonia, is not essential. The action of the reagent in the flotation machine upon the material appears to be that the alum attacks the lime and liberates the carbonic acid, and similar gases, which then are volatilized by the ammonia, and are eliminated from the mixture in the form of bubbles which escape from the surface of the liquid. The pulverized material after being so treated is collected and dried, and will be found to be practically free from all volatile matter, and consequently will have reached its maximum density and shrinkage.

This ends the process so far as the treatment of clay and minerals like magnesite and dolomite are concerned, and the resulting solid may then be used for any purposes for which it is adapted, such as making into bricks, pottery, etc. The powdered material may be readily formed into any desired shape by the use of a binder composed of silica and borax.

If the material subjected to the foregoing roasting treatment is an ore, it is treated in the separator and the metallic content may be further enriched by passing it over a concentrating table or subjecting it to an oil flotation machine suitable for the purpose. The non-metallic content of the ore is of course drawn off at suitable stages from the separator, and if it is a refractory material, it may be used for the purpose for which it is adapted.

By treating minerals such as dolomite by the above process a very hard, highly refractory homogeneous material results, which is ideal for making refractory bricks and furnace linings. It has a high carbon content which renders it very hard and refractory.

The process does not in any way injure the metal contents of the ores, while at the same time it permits the manufacture of a useful refractory product from the gangue contained therein.

I am aware that the materials referred to have been roasted to take out volatile matter, and shrinkage, and also that the product has been subjected to flotation processes for separation. But I believe that I am the first to combine the various steps set forth, and to use chemical reagents for liberating and eliminating the gases which are not driven off in the preliminary roasting, in combination with a liquid separation machine.

I claim:

1. The process of eliminating volatile matter and gases from material, comprising the steps of roasting the material, crushing and pulverizing it, and then agitating it in a mixture of water and alum.

2. The process of eliminating volatile matter and gases from material, comprising the steps of roasting the material, crushing and pulverizing it, and then agitating it in a mixture of water and ammonia.

3. The process of eliminating volatile matter and gases from material, comprising the steps of roasting the material, crushing and pulverizing it, and agitating it in a mixture of water, ammonia, and alum.

In testimony whereof, I have hereunto set my hand.

SAMUEL L. BOGGS.

Witness:
HOWARD L. SNIVELY.